US011934139B2

(12) United States Patent
Nguyen

(10) Patent No.: US 11,934,139 B2
(45) Date of Patent: Mar. 19, 2024

(54) IMAGE FORMING APPARATUS CAPABLE OF STOPPING ACCESS OPENING CLOSURE HINGE-MOUNTED TO BODY HOUSING IN DIFFERENT OPEN POSITIONS

(71) Applicant: KYOCERA Document Solutions Inc., Osaka (JP)

(72) Inventor: Chien Danh Nguyen, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/126,071

(22) Filed: Mar. 24, 2023

(65) Prior Publication Data

US 2023/0314999 A1 Oct. 5, 2023

(30) Foreign Application Priority Data

Mar. 29, 2022 (JP) ................................ 2022-052914

(51) Int. Cl.
*G03G 21/00* (2006.01)
*G03G 21/16* (2006.01)

(52) U.S. Cl.
CPC ..... *G03G 21/1628* (2013.01); *G03G 21/1633* (2013.01); *B65H 2402/441* (2013.01); *G03G 2221/1687* (2013.01)

(58) Field of Classification Search
CPC ........... G03G 21/1628; G03G 21/1633; G03G 21/1647; G03G 2221/1687; B65H 2402/441; B65H 2402/442; B65H 2402/45; H05K 5/0226; G06F 1/1681; H04N 1/00554; E05D 11/1028; E05D 11/105; E05D 15/246; E05D 15/248; E05D 2015/487; E05Y 2201/11; E05Y 2900/606
USPC .................................................. 399/107, 125
See application file for complete search history.

(56) References Cited

U.S. PATENT DOCUMENTS

| | | | | |
|---|---|---|---|---|
| 9,996,048 B1 * | 6/2018 | Keniston | E05D 11/1007 |
| 2005/0084290 A1 | 4/2005 | Baek | |
| 2006/0120756 A1 * | 6/2006 | Ahn | G03G 21/1633 399/124 |
| 2008/0232847 A1 * | 9/2008 | Kusukawa | G03G 21/1671 399/114 |

(Continued)

FOREIGN PATENT DOCUMENTS

JP 2005122137 A 5/2005

*Primary Examiner* — Robert B Beatty
(74) *Attorney, Agent, or Firm* — IP Business Solutions, LLC

(57) ABSTRACT

An image forming apparatus includes: a body housing; an access opening closure; a rotary member rotatable relative to the body housing; a first link member coupled to the rotary member; a second link member coupling the access opening closure to the first link member, having a first end pivotally movable relative to the access opening closure and a second end slidable along the first link member, and including a slit connecting the first end and the second end; a cutaway communicating with the slit near the second end and then turning around, and narrower than the slit; a pin mounted on the body housing and located within the slit; a boss projecting from the first end; and an elongated socket mounted on the access opening closure and receiving the boss slidably. A sliding resistance between the boss and the elongated socket is larger than between the pin and the slit.

5 Claims, 18 Drawing Sheets

(56) References Cited

U.S. PATENT DOCUMENTS

| | | | | |
|---|---|---|---|---|
| 2010/0046979 | A1* | 2/2010 | Lee | G03G 21/1633 399/110 |
| 2011/0134455 | A1* | 6/2011 | Nagashima | H04N 1/00554 358/1.13 |
| 2013/0127318 | A1* | 5/2013 | Chen | B41J 29/13 312/327 |
| 2015/0309469 | A1* | 10/2015 | Kusano | G03G 21/1633 399/110 |
| 2017/0190193 | A1* | 7/2017 | Migita | B41J 29/02 |
| 2022/0097987 | A1* | 3/2022 | Nguyen | B65H 1/02 |

* cited by examiner

IMAGE FORMING APPARATUS CAPABLE OF STOPPING ACCESS OPENING CLOSURE HINGE-MOUNTED TO BODY HOUSING IN DIFFERENT OPEN POSITIONS

INCORPORATION BY REFERENCE

This application claims priority to Japanese Patent Application No. 2022-052914 filed on 29 Mar. 2022, the entire contents of which are incorporated by reference herein.

BACKGROUND

The present disclosure relates to image forming apparatuses.

There are known image forming apparatuses provided with an openable and closable cover over an access opening in the top of the main body. For example, a generally known image forming apparatus is designed to be capable of exchanging parts or units while the cover on the body top is in an open position.

SUMMARY

A technique improved over the aforementioned technique is proposed as one aspect of the present disclosure. An image forming apparatus according to an aspect of the present disclosure includes a body housing, an access opening closure, and a link mechanism. The access opening closure is mounted through a hinge to the body housing. The link mechanism operates in conjunction with opening and closing movement of the access opening closure. The link mechanism includes a rotary member, a first link member, a second link member, a cutaway, a pin, a boss, and an elongated socket. The rotary member is mounted rotatably to the body housing. The first link member is coupled to the rotary member. The second link member couples the access opening closure to the first link member, is pivotally movable at a first end thereof relative to the access opening closure and slidable at a second end thereof with the first link member in a longitudinal direction of the first link member, and is provided with a slit extending in a direction of connection between the first end and the second end. The cutaway is formed to communicate with the slit near the second end of the second link member and turn around toward the first end of the second link member and is narrower than a portion of the slit near the second end of the second link member. The pin is mounted on the body housing and located within the slit. The boss projects in an axial direction of the rotary member from the first end of the second link member. The elongated socket is mounted on the access opening closure and receives the boss slidably therein. A sliding resistance between the boss and the elongated socket is larger than a sliding resistance between the pin and the slit of the second link member.

DETAILED DESCRIPTION

Hereinafter, a description will be given of a printer 1 according to an embodiment of the present disclosure with reference to the drawings.

Figure 1:
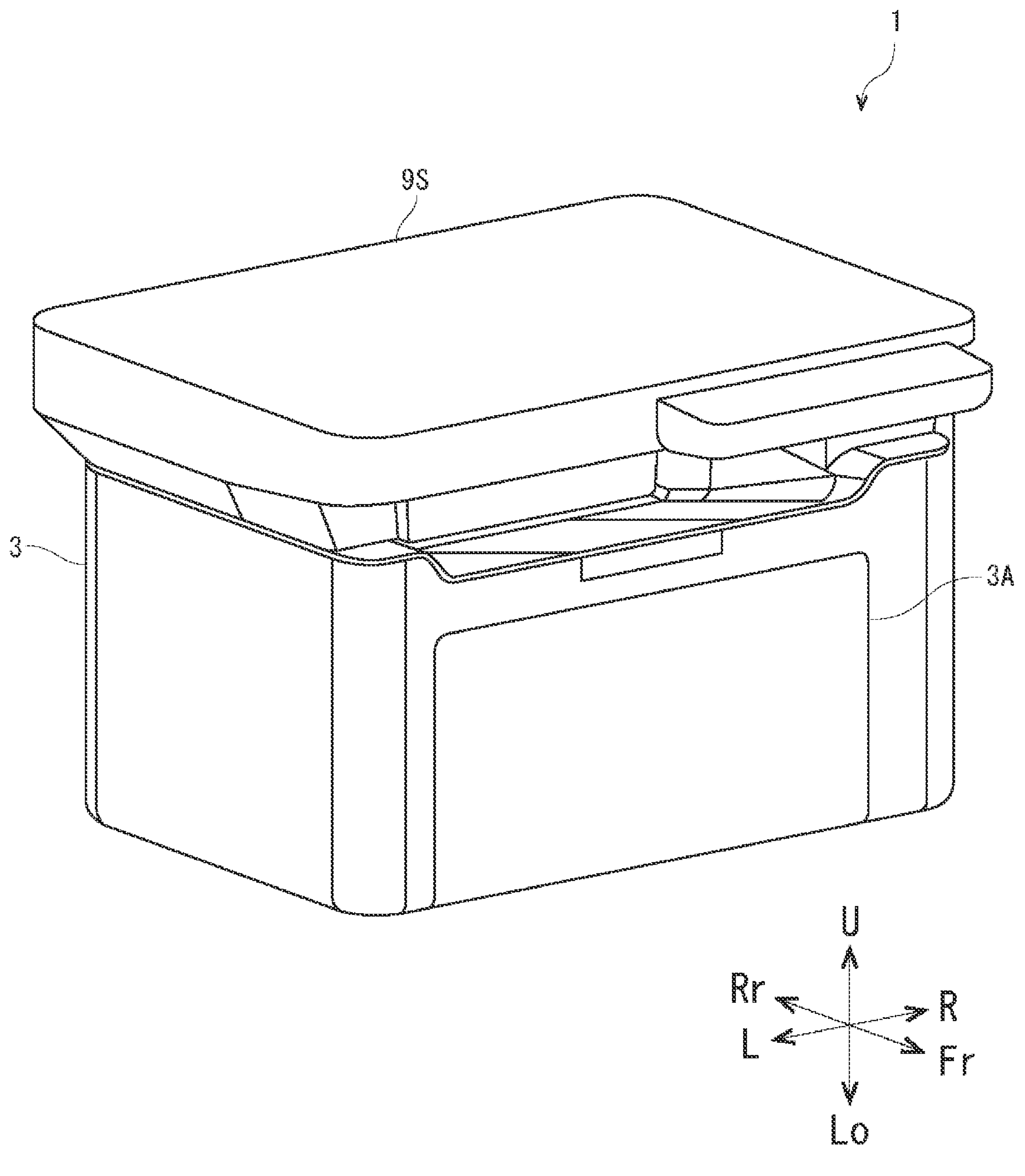
FIG. 1 is a perspective view showing the appearance of a printer.
Figure 2:
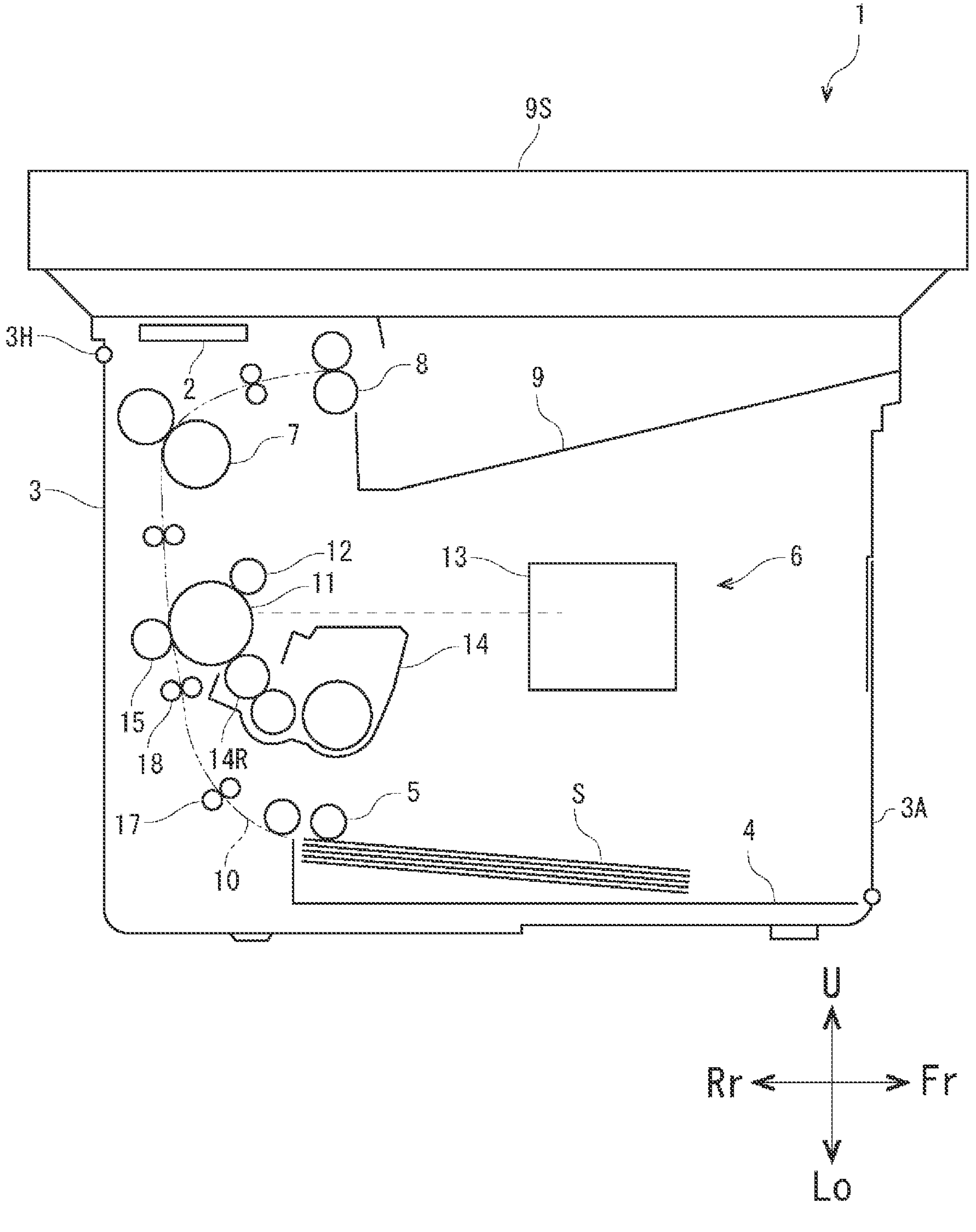
FIG. 2 is a left side view schematically showing the internal structure of the printer.

First, a description will be given of an overall structure of the printer 1. FIG. 1 is a perspective view showing the appearance of the printer 1. FIG. 2 is a left side view schematically showing the internal structure of the printer 1. Hereinafter, the "Fr" side in FIGS. 1 and 2 is taken as the front side of the printer 1. The right and left directions are based on those when the printer 1 is viewed from the front. The signs U, Lo, L, R, Fr, and Rr in figures represent upper, lower, left, right, front, and rear, respectively.

The printer 1 includes a cuboidal body housing 3. A lower portion of the body housing 3 is internally provided with: a sheet feed tray 4 on which sheets S are to be loaded; and a sheet feed roller 5 that feeds a sheet S from the sheet feed tray 4. The body housing 3 is provided at the front with a front cover 3A openable and closable about a hinge provided at a lower portion of the front. The sheets S are loaded onto the sheet feed tray 4 while the front cover 3A is open. Above the sheet feed tray 4, an image forming device 6 capable of forming a toner image by an electrophotographic system and a fixing device 7 capable of fixing the toner image on a sheet S are provided. An upper portion of the body housing 3 is internally provided with: an ejection roller pair 8 that ejects the sheet S with the tonner image fixed thereon; and a sheet output tray 9 on which the ejected sheet S is to be placed.

The image forming device 6 includes: a photosensitive drum 11 that changes its potential upon irradiation with light; a charging device 12 that electrically charges the photosensitive drum 11 by electric discharge; an exposure device 13 that emits laser light according to image data; a developing device 14 that supplies a toner to the photosensitive drum 11; and a transfer roller 15 that generates a transfer bias.

The body housing 3 is internally provided with a conveyance path 10 extending from the sheet feed roller 5 via the image forming device 6 and the fixing device 7 to the ejection roller pair 8. A plurality of conveyance roller pairs 17 that convey a sheet S are provided in the conveyance path 10. A registration roller pair 18 is provided upstream of the image forming device 6 in the direction of conveyance.

The above components of the printer 1 are controlled by a control device 2. The control device 2 includes a processor and a memory. The processor is, for example, a CPU (central processing unit). The memory includes a storage medium, such as a ROM (read only memory), a RAM (random access memory) or an EEPROM (electrically erasable programmable read only memory). The processor executes various types of processing by reading and running a control program stored in the memory. The control device 2 may be implemented by an integrated circuit without using software.

Next, a description will be given of the summary of an image forming operation of the printer 1. When a print job is input from an external computer or the like to the printer 1, the sheet feed roller 5 feeds a sheet S from the sheet feed tray 4 to the conveyance path 10. The registration roller pair 18 kept unrotated corrects the skew of the sheet S. The registration roller pair 18 feeds the sheet S to the image forming device 6 with a predetermined timing. In the image forming device 6, the charging device 12 electrically charges the photosensitive drum 11 to a predetermined potential. The exposure device 13 writes a latent image onto the photosensitive drum 11. The developing device 14 uses a toner supplied from a toner container to develop the latent image, thus forming a toner image. The transfer roller 15 transfers the toner image to the sheet S. The fixing device 7 fixes the toner image on the sheet S by melting the toner image on the sheet S while pinching and carrying the sheet S. The ejection roller pair 8 ejects the sheet S onto the sheet output tray 9.

Figure 3:
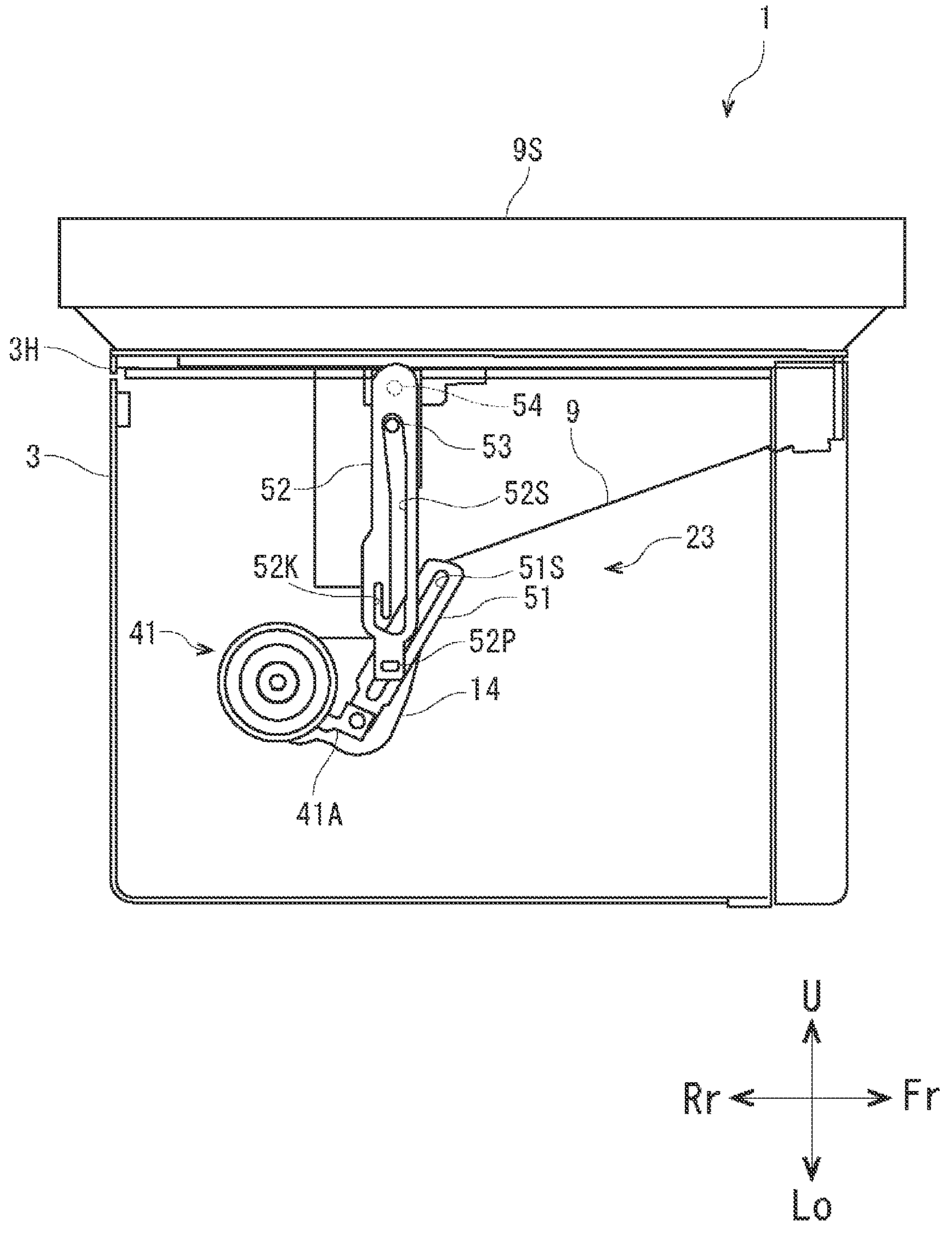
FIGS. 3 to 5 are left side views schematically showing a link mechanism.
Figure 4:
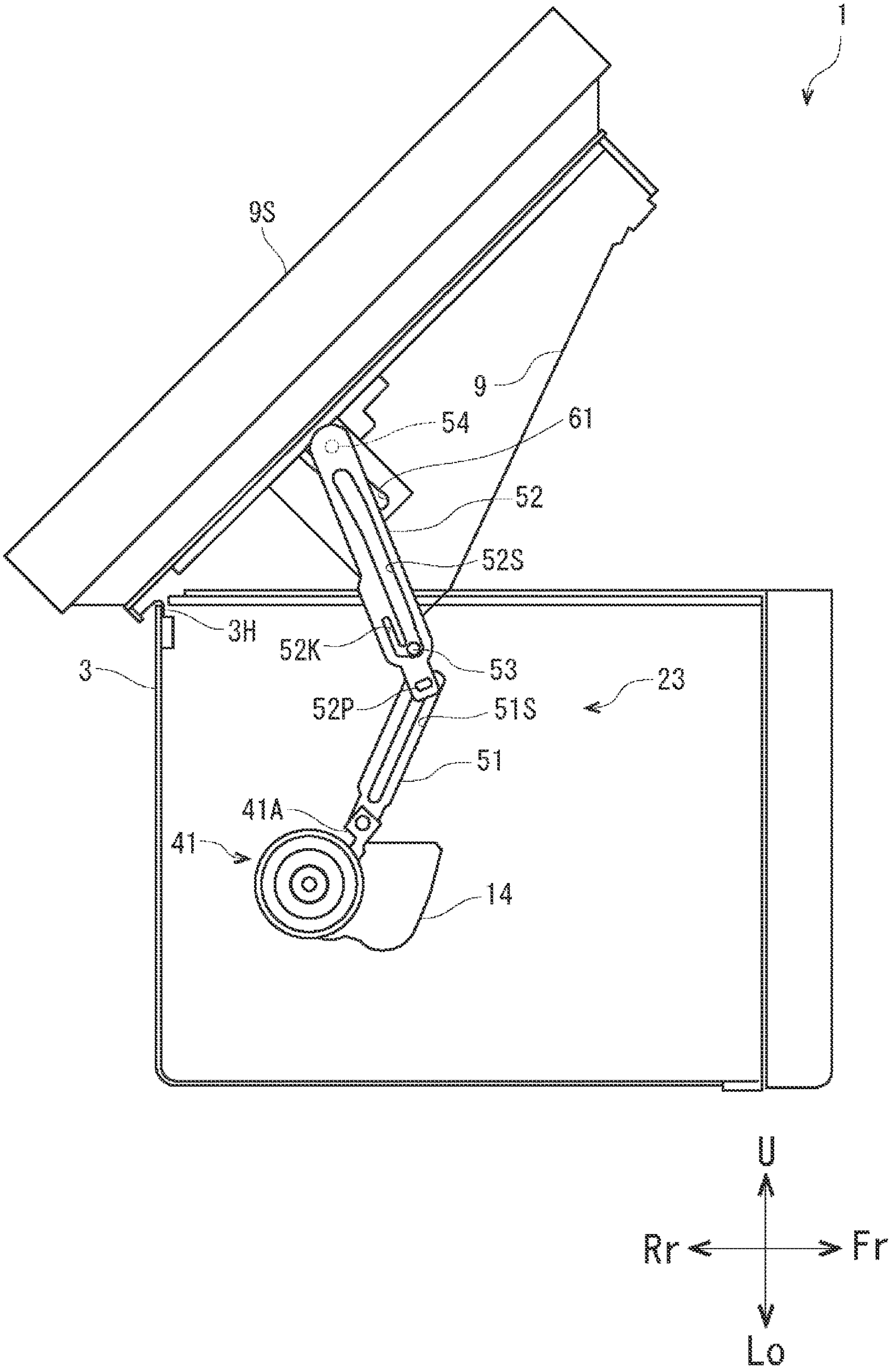
Figure 5:
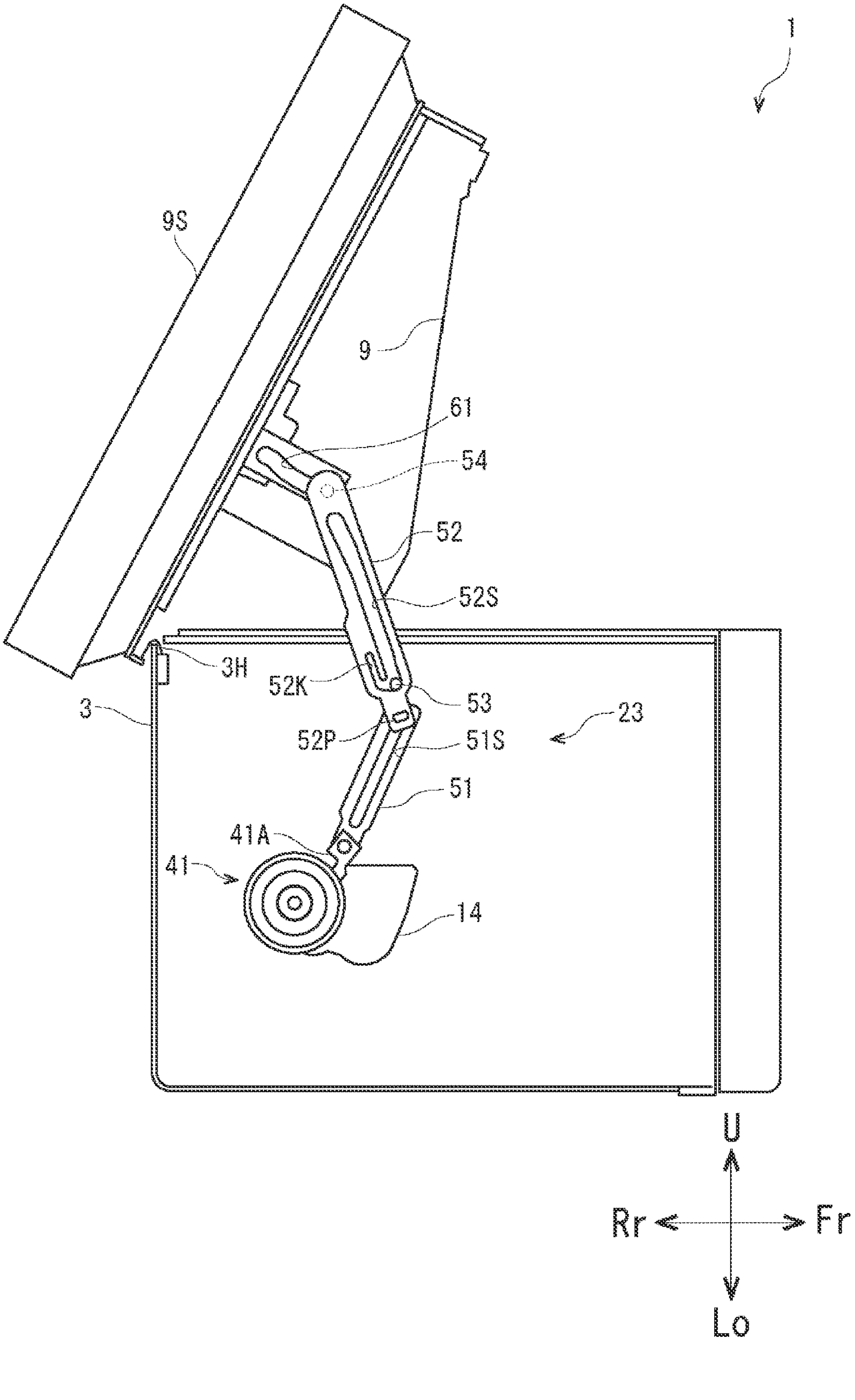
Figure 6:
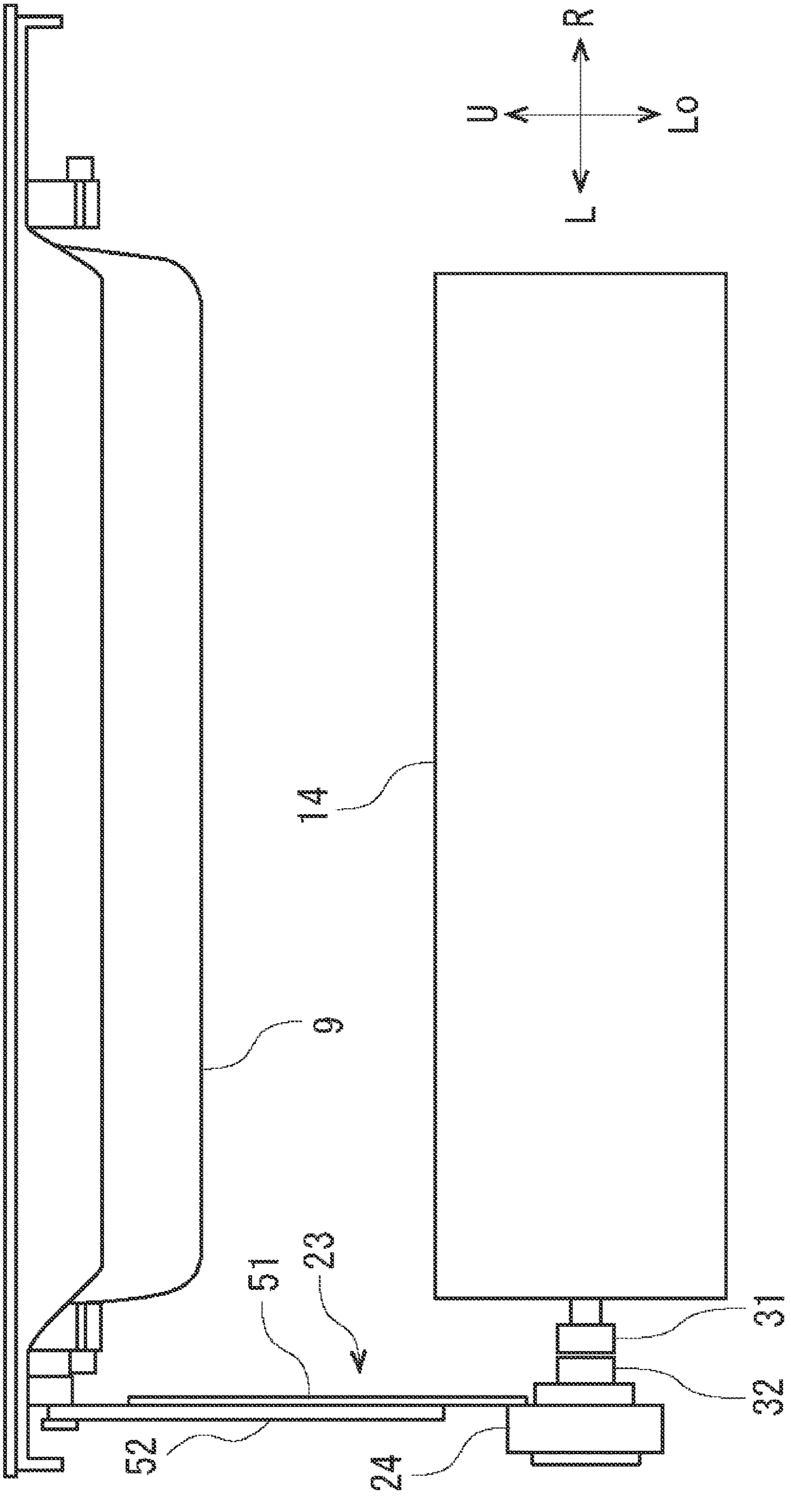
FIGS. 6 and 7 are frontal views schematically showing the link mechanism.
Figure 7:
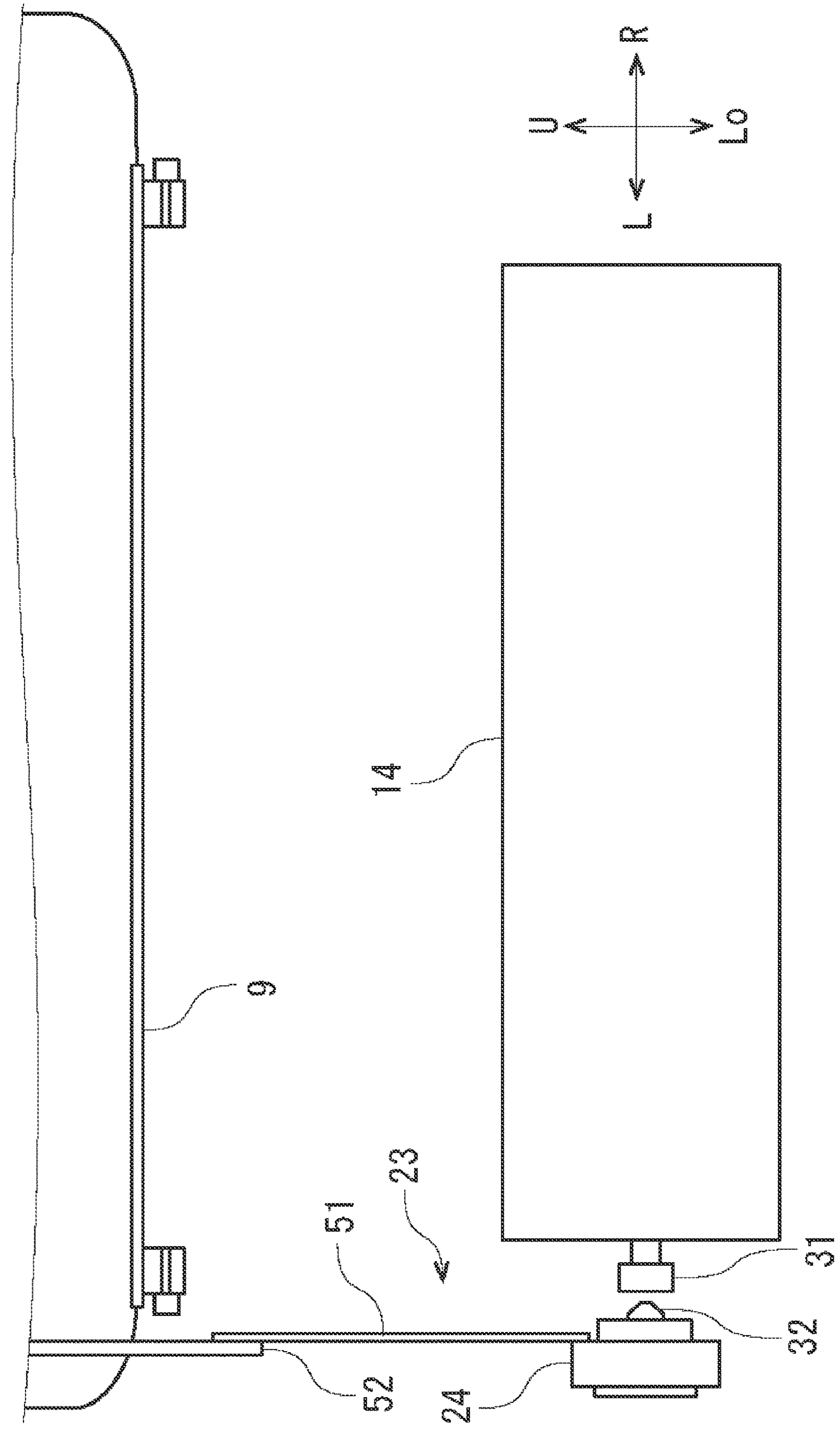
Figure 8:
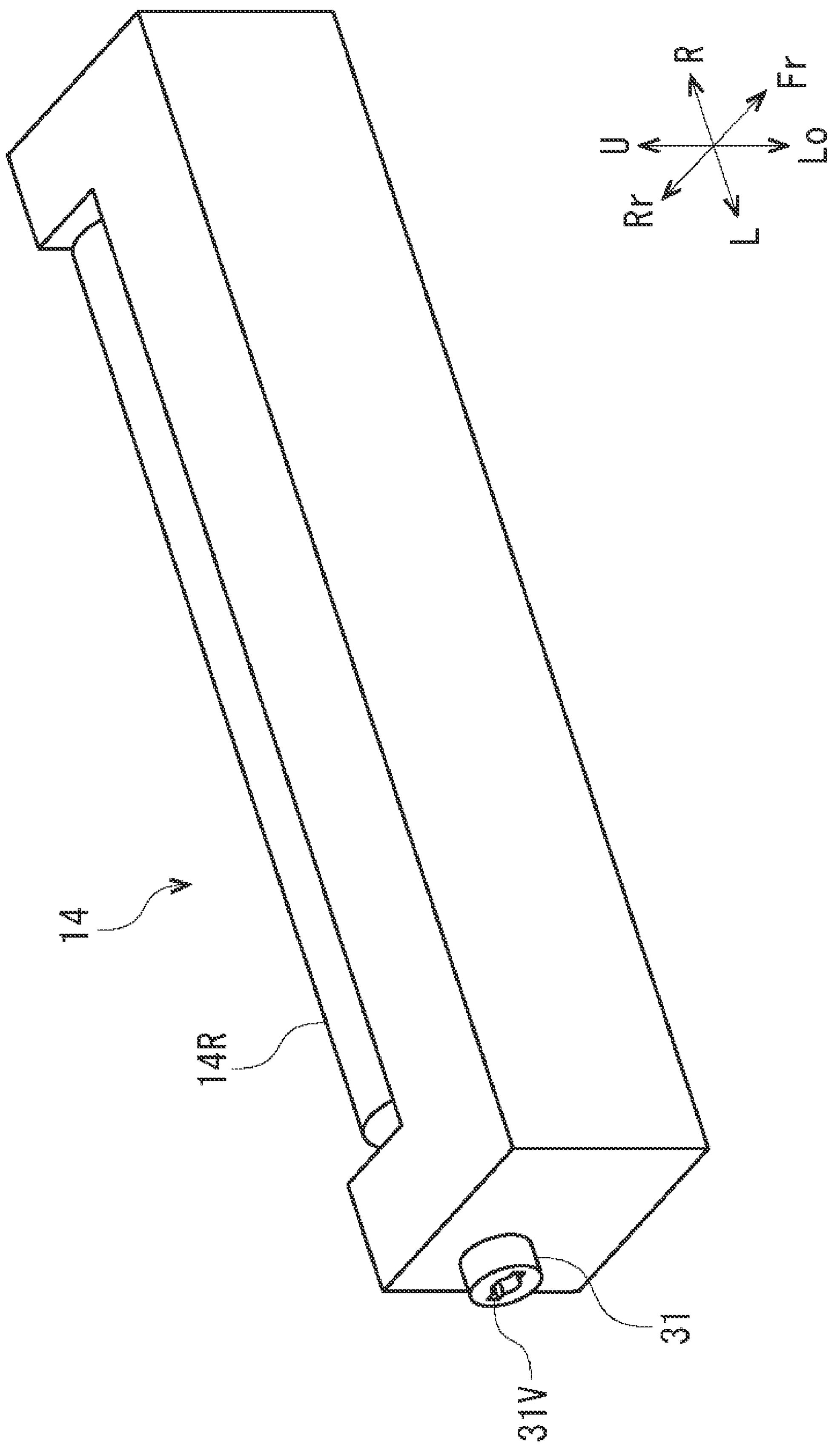
FIG. 8 is a perspective view of a developing device.
Figure 9:
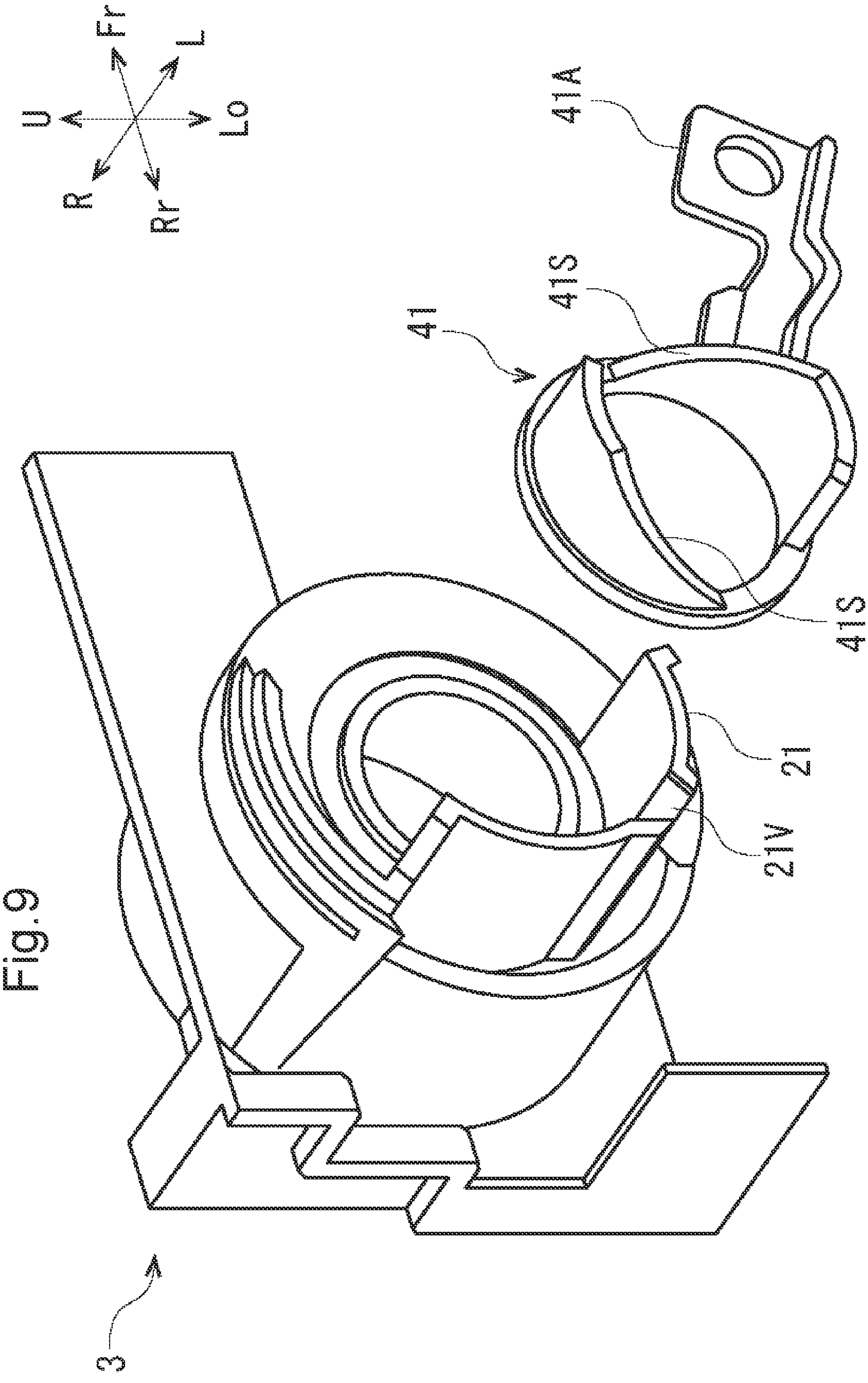
FIG. 9 is a perspective view showing how a rotary member is mounted to a body housing.
Figure 10:
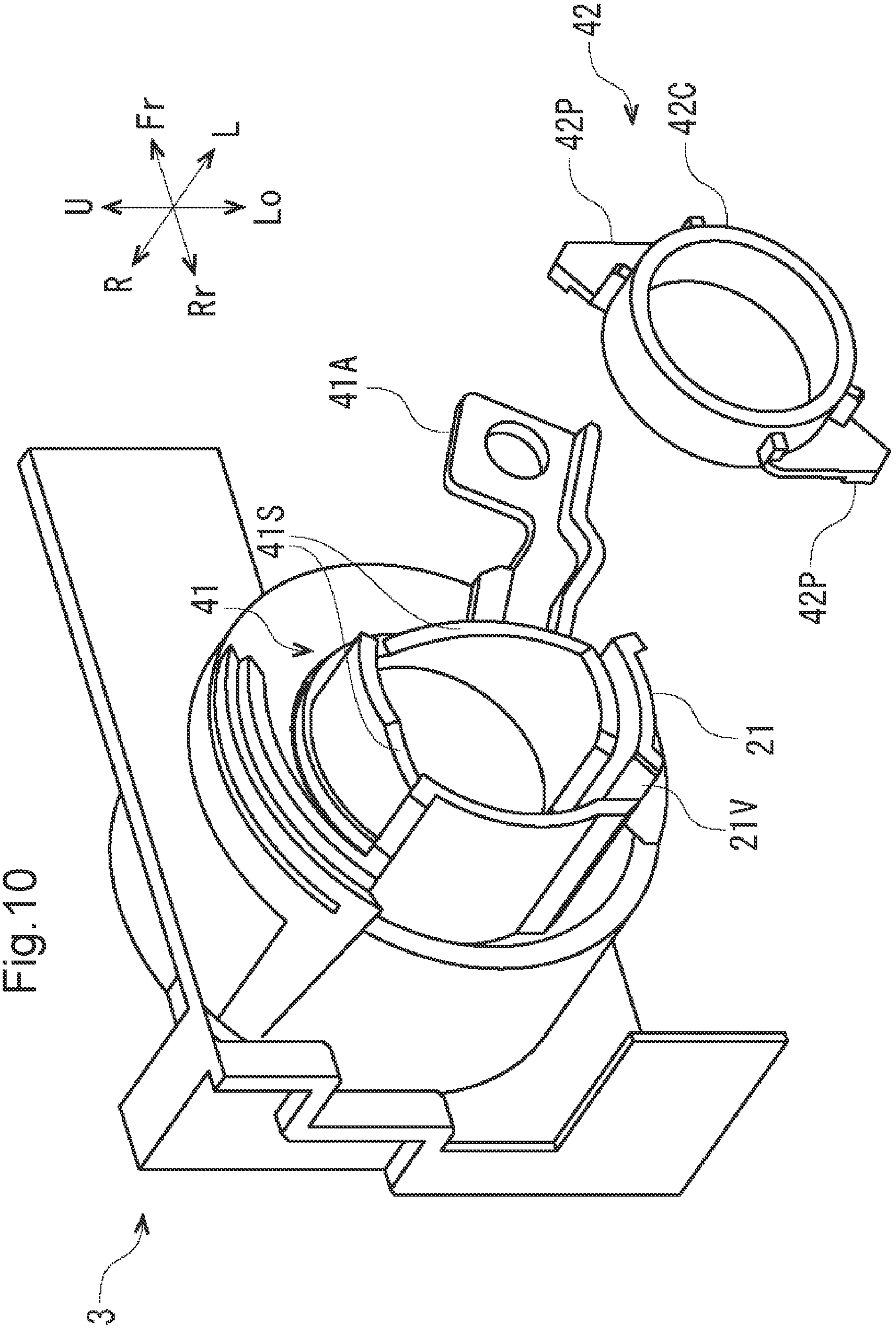
FIG. 10 is a perspective view showing how a slide member is mounted to the body housing.
Figure 11:
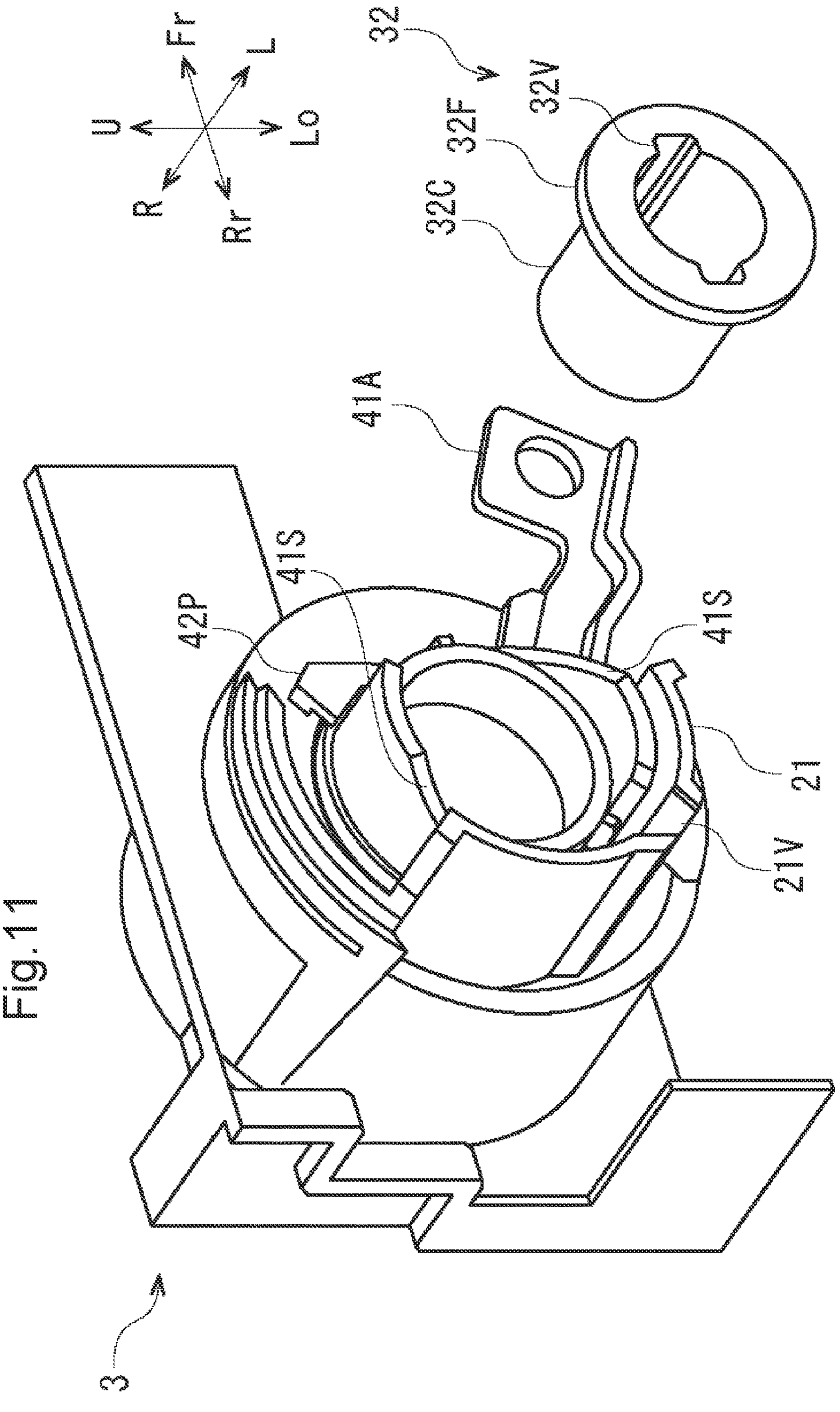
FIG. 11 is a perspective view showing how a second coupling is mounted to the body housing.
Figure 12:
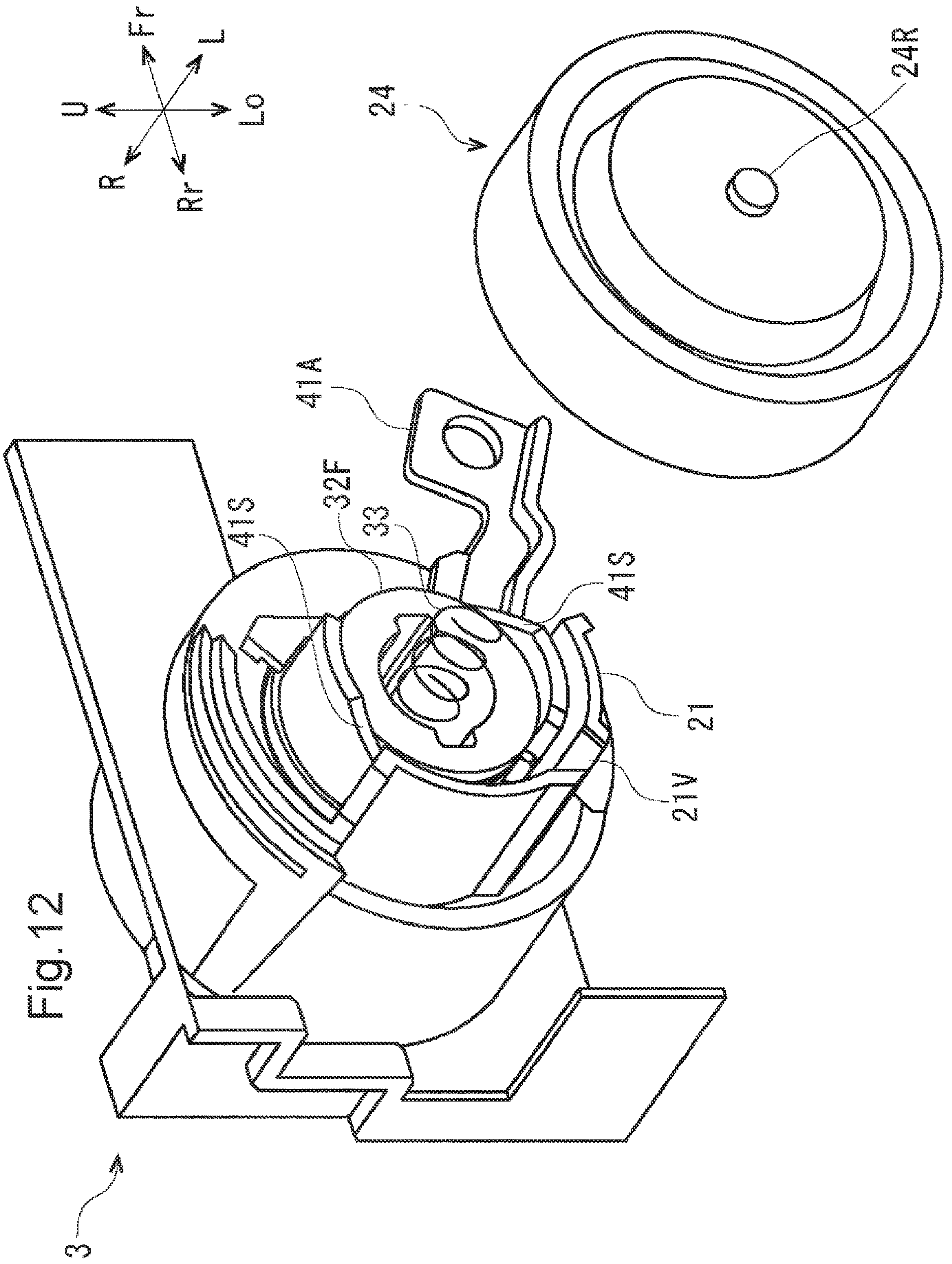
FIG. 12 is a perspective view showing how a drive gear is mounted to the body housing.
Figure 13:
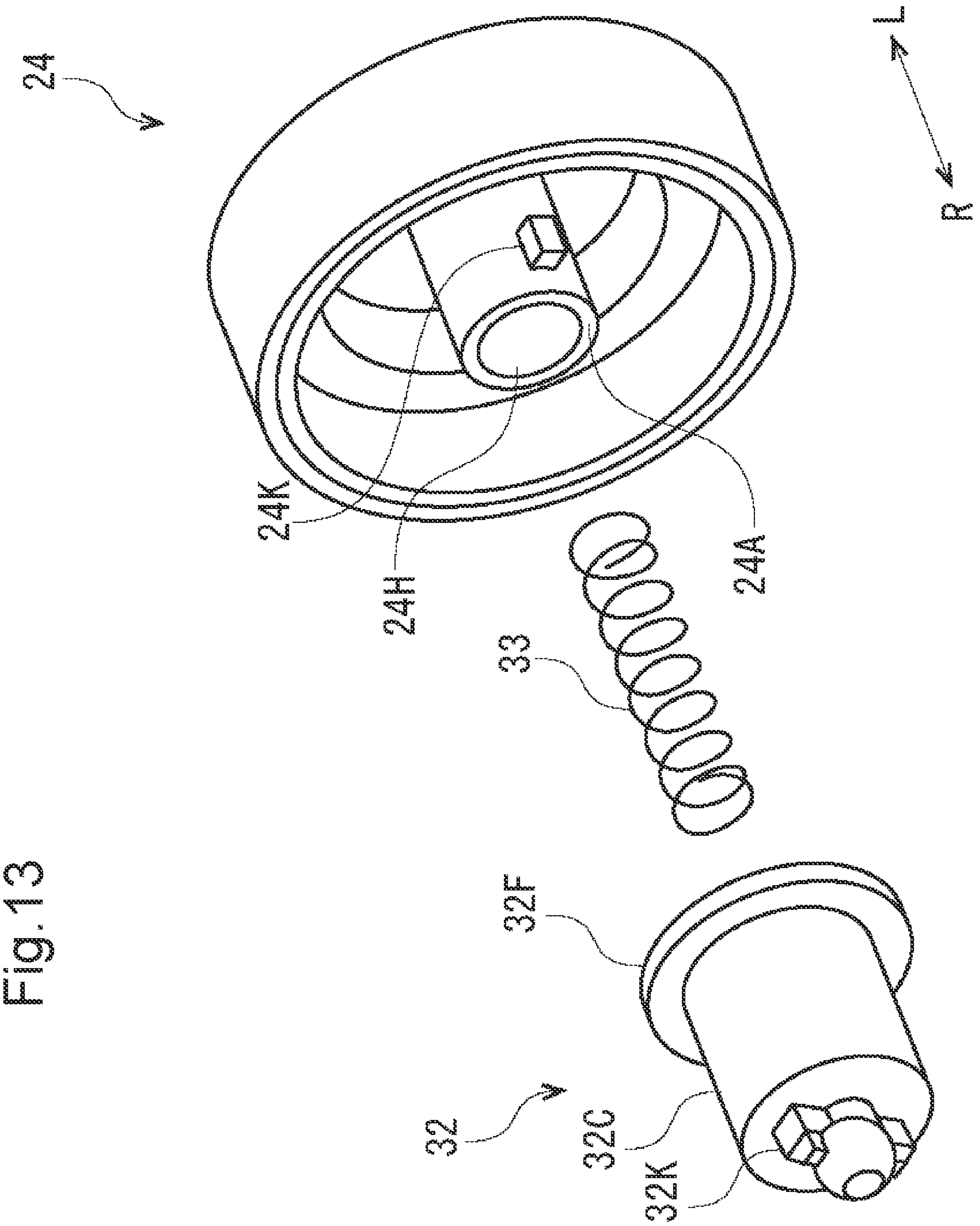
FIG. 13 is a perspective view showing the drive gear, a biasing member, and the second coupling.
Figure 14:
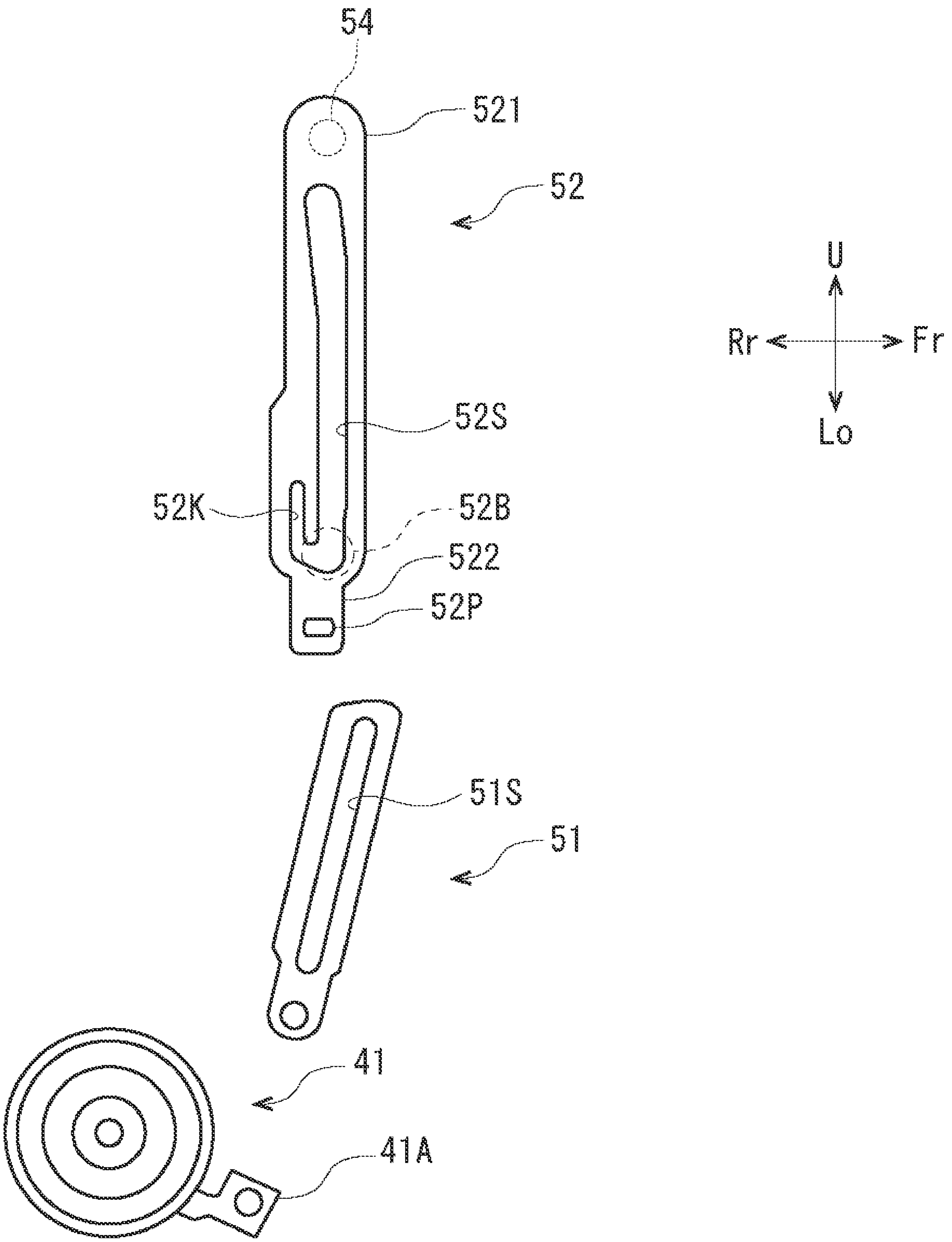
FIG. 14 is an exploded view of the link mechanism.

Next, a detailed description will be given of the mechanism of linkage between the developing device 14 and the drive gear 24. FIGS. 3 to 5 are left side views schematically showing a link mechanism 23. FIGS. 6 and 7 are frontal views schematically showing the link mechanism 23. FIG. 8 is a perspective view of the developing device 14. FIG. 9 is a perspective view showing how a rotary member 41 is mounted to the body housing 3. FIG. 10 is a perspective view showing how a slide member 42 is mounted to the body housing 3. FIG. 11 is a perspective view showing how a second coupling 32 is mounted to the body housing 3. FIG. 12 is a perspective view showing how the drive gear 24 is mounted to the body housing 3. FIG. 13 is a perspective view showing the drive gear 24, a biasing member 33, and the second coupling 32. FIG. 14 is an exploded view of the link mechanism 23.

The printer 1 includes the body housing 3, an access opening closure (a sheet output tray 9) mounted through a hinge 3H to the body housing 3, and the link mechanism 23 operatively associated with the opening and closing movement of the access opening closure. The link mechanism 23 includes the rotary member 41, a first link member 51, a second link member 52, a pin 53, a boss 54, and an elongated socket 61. The rotary member 41 is mounted rotatably to the body housing 3. The first link member 51 is coupled to the rotary member 41. The second link member 52 couples the access opening closure to the first link member 51. A first end 521 of the second link member 52 is pivotally movable relative to the access opening closure. A second end 522 of the second link member 52 is slidable with the first link member 51 in a longitudinal direction of the first link member 51.

The second link member 52 is provided with a slit 52S extending in a direction of connection between the first end 521 and the second end 522. The second link member 52 is provided with a cutaway 52K. The cutaway 52K is formed to communicate with the slit 52S near the second end 522 of the second link member 52 and turn around toward the first end 521 of the second link member 52. The cutaway 52K is narrower than a portion of the slit 52S near the second end 522. The pin 53 is mounted on the body housing 3 and located within the slit 52S. The boss 54 projects in an axial direction of the rotary member 41 from the first end 521 of the second link member 52 near the access opening closure. The elongated socket 61 is mounted on the access opening closure and receives the boss 54 slidably therein. The sliding resistance between the boss 54 and the elongated socket 61 is larger than that between the pin 53 and the slit 52S in the second link member 52.

[Access Opening Closure]

The sheet output tray 9 (access opening closure) is formed as a separate member from the body housing 3. The top of the body housing 3 has an access opening formed to accommodate the sheet output tray 9.

A document reading device 9S is provided over the sheet output tray 9. The document reading device 9S is a flatbed image scanner. The document reading device 9S and the sheet output tray 9 are integrated and connected through the hinge 3H to the body housing 3. The sheet output tray 9 and the document reading device 9S can be opened upward about the hinge 3H.

[Developing Device 14 and First Coupling 31]

The developing device 14 (see FIGS. 2 and 8) is disposed slightly rearward of the middle of the depth of the body housing 3. The developing device 14 includes: a screw that stirs a developer containing a toner and a magnetic carrier; and a developing roller 14R that retains the developer by magnetic attraction. The outer peripheral surface of the developing roller 14R faces the photosensitive drum 11. The developing roller 14R is provided at the left end with a first coupling 31 engageable with a second coupling 32 to be described hereinafter.

[Drive Gear 24, Second Coupling 32, and Biasing Member 33]

The drive gear 24 (see FIG. 13) transmits, through the second coupling 32 and the first coupling 31 (see FIG. 8) to the developing roller 14R, a drive force produced by a drive device including a motor and a gear train. A shaft 24A of the drive gear 24 is provided with keys 24K projecting in a radial direction of the shaft 24A. The shaft 24A includes a hollow 24H. A pivot shaft 24R (see FIG. 12) is inserted into the hollow 24H and supports the drive gear 24 to allow rotation of the drive gear 24.

The body housing 3 is provided on the left side with a support 21 (see FIGS. 9 to 12) that supports the drive gear 24 and the link mechanism 23. The support 21 is formed in the shape of a shell forming a portion of a cylinder having a diameter smaller than the inner diameter of the drive gear 24 and larger than the outer diameter of the rotary member 41. The support 21 supports the rotary member 41 coaxially with the drive gear 24.

The second coupling 32 (see FIG. 13) includes a cylindrical portion 32C having a larger diameter than the shaft 24A of the drive gear 24. The cylindrical portion 32C is provided at the left end with a flange 32F. The cylindrical portion 32C is provided at the right end with keys 32K projecting in a radial direction of the cylindrical portion 32C. The first coupling 31 includes grooves 31V (see FIG. 8) formed to be fittable onto the keys 32K of the second coupling 32. The inner peripheral surface of the cylindrical portion 32C of the second coupling 32 is provided with grooves 32V (see FIG. 11) fittable onto the keys 24K of the drive gear 24. The biasing member 33 is a coil spring. The biasing member 33 is inserted into the cylindrical portion 32C of the second coupling 32 and biases the second coupling 32 to the right.

[Link Mechanism 23]

The link mechanism 23 (see FIGS. 3 to 7 and 14) includes the rotary member 41, a slide member 42, the first link member 51, the second link member 52, and the pin 53. The rotary member 41 is mounted to the body housing 3 coaxially rotatably with respect to the drive gear 24. The first link member 51 connects the sheet output tray 9 and the rotary member 41. The slide member 42 is mounted to the body housing 3 in an axially slidable manner. When the rotary member 41 rotates forward, the slide member 42 pushes out the second coupling 32 against the bias of the biasing member 33. When the rotary member 41 rotates backward, the slide member 42 releases the pushing against the second coupling 32.

The first link member 51 rotates the rotary member 41 forward in conjunction with the opening movement of the sheet output tray 9 and rotates the rotary member 41 backward in conjunction with the closing movement of the sheet output tray 9. The second link member 52 couples the sheet output tray 9 to the first link member 51. The second link member 52 is pivotally movable at the upper end (an example of the first end 521) relative to the sheet output tray 9 and slidable at the lower end (an example of the second end 522) with the first link member 51 in the longitudinal direction of the first link member 51. The second link member 52 is provided with a slit 52S extending in a direction of connection between the first end 521 and the second end 522. The pin 53 is mounted on the body housing 3 and located within the slit 52S.

The support 21 (see FIG. 9) of the body housing 3 includes an axially extending groove 21V. The second coupling 32 (see FIG. 11) includes the flange 32F. The slide member 42 (see FIG. 10) includes: an annular portion 42C abuttable with a surface of the flange 32F closer to the first coupling 31; and projections 42P projecting radially outward from the annular portion 42C and fittable into the groove 21V. The inner diameter of the annular portion 42C is larger than the outer diameter of the cylindrical portion 32C of the second coupling 32.

The rotary member 41 (see FIG. 9) has a shape in which a portion of a cylindrical member is cut away. The inner diameter of the rotary member 41 is larger than the outer diameter of the slide member 42. The rotary member 41 includes inclined portions 41S shaped so that, during forward rotation, their abutment points with the projections 42P of the slide member 42 move oppositely to the biasing direction of the biasing member 33. The rotary member 41 includes a radially projecting arm 41A. The arm 41A is connected to the lower end of the first link member 51 to allow swinging motion of the lower end of the first link member 51. The first link member 51 includes a slit 51S along the longitudinal direction thereof. A pin 52P provided on the lower end of the second link member 52 slides within and along the slit 51S.

The sliding resistance of a portion of the slit 52S near the second end 522 to the pin 53 is larger than that of a portion of the slit 52S near the first end 521 to the pin 53. Specifically, the portion of the slit 52S near the second end 522 is narrower than the portion of the slit 52S near the first end 521 (see FIG. 14). The width of the portion of the slit 52S near the first end 521 is equal to or larger than the diameter of the pin 53, whereas the width of the portion of the slit 52S near the second end 522 is smaller than the diameter of the pin 53. The second link member 52 is formed of a flexible resin. When the portion of the slit 52S near the second end 522 slides on the pin 53, it is expanded by the pin 53.

The second link member 52 includes the cutaway 52K. The cutaway 52K is formed to communicate with the slit 52S near the second end 522 of the second link member 52 and turn around toward the first end 521 of the second link member 52. The cutaway 52K is narrower than the portion of the slit 52S near the second end 522. A portion of the slit 52S near the second end 522 and adjacent to the cutaway 52K is further narrowed in width. The pin 53 gets stuck in a boundary portion 52B between the slit 52S and the cutaway 52K, thus stopping the movement of the sheet output tray 9. The angle of tilt (angle of rotation) of the sheet output tray 9 to the horizontal when the pin 53 gets stuck into the boundary portion 52B between the slit 52S and the cutaway 52K is within a range of not less than 40° and not more than 50° (for example, 45°). The portion of the slit 52S near the first end 521 is inclined at a shallow angle (for example, about 5°) to the portion of the slit 52S near the second end 522. With this structure, the feeling of operating the sheet output tray 9 changes when the pin 53 transitions from the first end 521 side of the slit 52A to the second end 522 side thereof.

The above members are assembled according to the following procedure. First, the rotary member 41 is inserted into the support 21 of the body housing 3 (see FIG. 9). Next, the slide member 42 is inserted into the rotary member 41 (see FIG. 10). In doing so, one of the projections 42P of the slide member 42 is inserted into the groove 21V in the support 21 of the body housing 3. Next, the second coupling 32 is inserted into the slide member 42 (see FIG. 11). In doing so, the flange 32F of the second coupling 32 abuts the annular portion 42C of the slide member 42. Next, the drive gear 24 held rotatably by the pivot shaft 24R is attached to the support 21 (see FIG. 12) and a mounting plate holding the pivot shaft 24R is fixed to the body housing 3. In doing so, the biasing member 33 is inserted between the second coupling 32 and the drive gear 24. Finally, the first link member 51 and the second link member 52 are coupled to the rotary member 41 and the sheet output tray 9, respectively (see FIG. 3).

Figure 15:
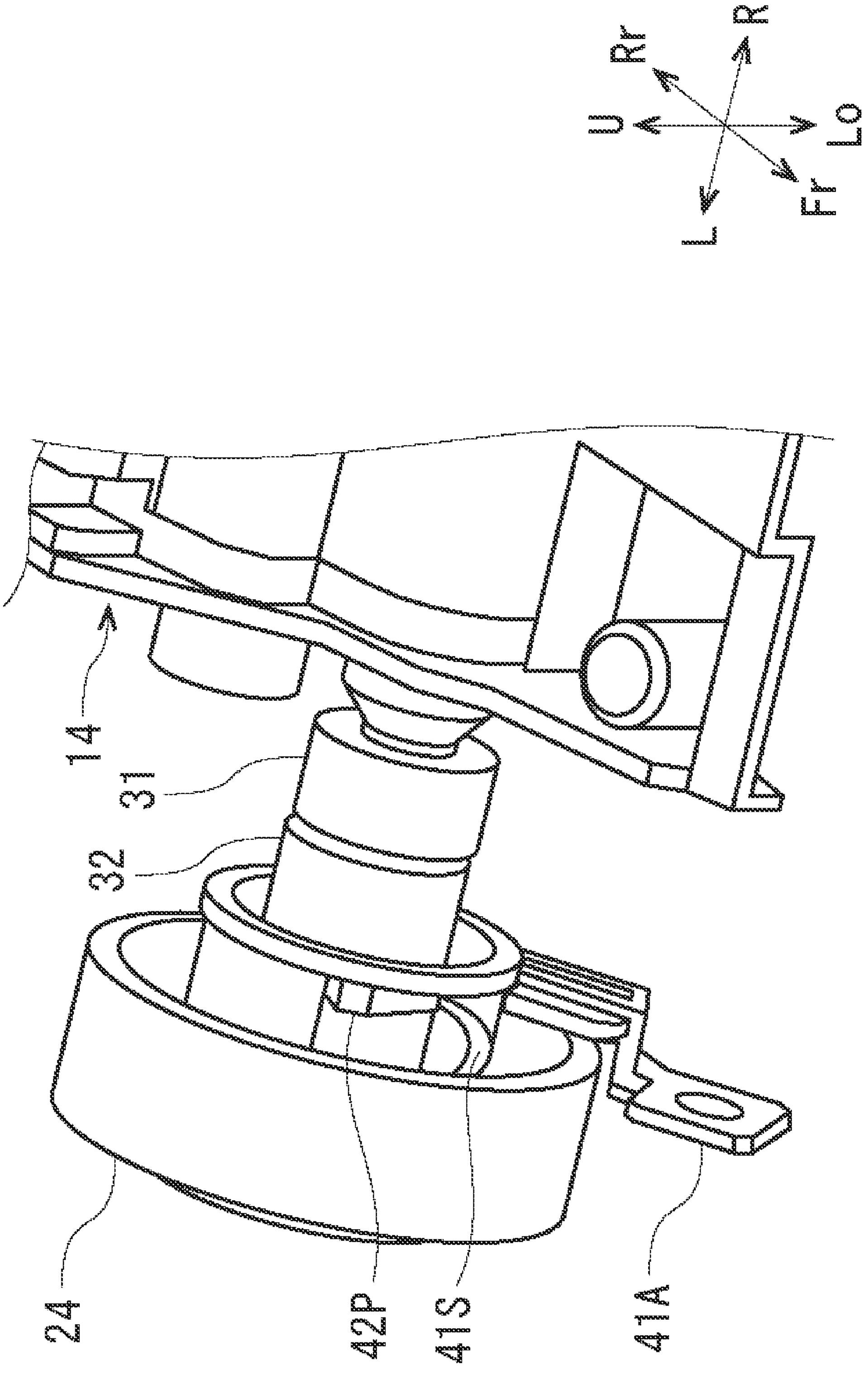
FIG. 15 is a perspective view of the second coupling and its surrounding area when a sheet output tray is closed.
Figure 16:
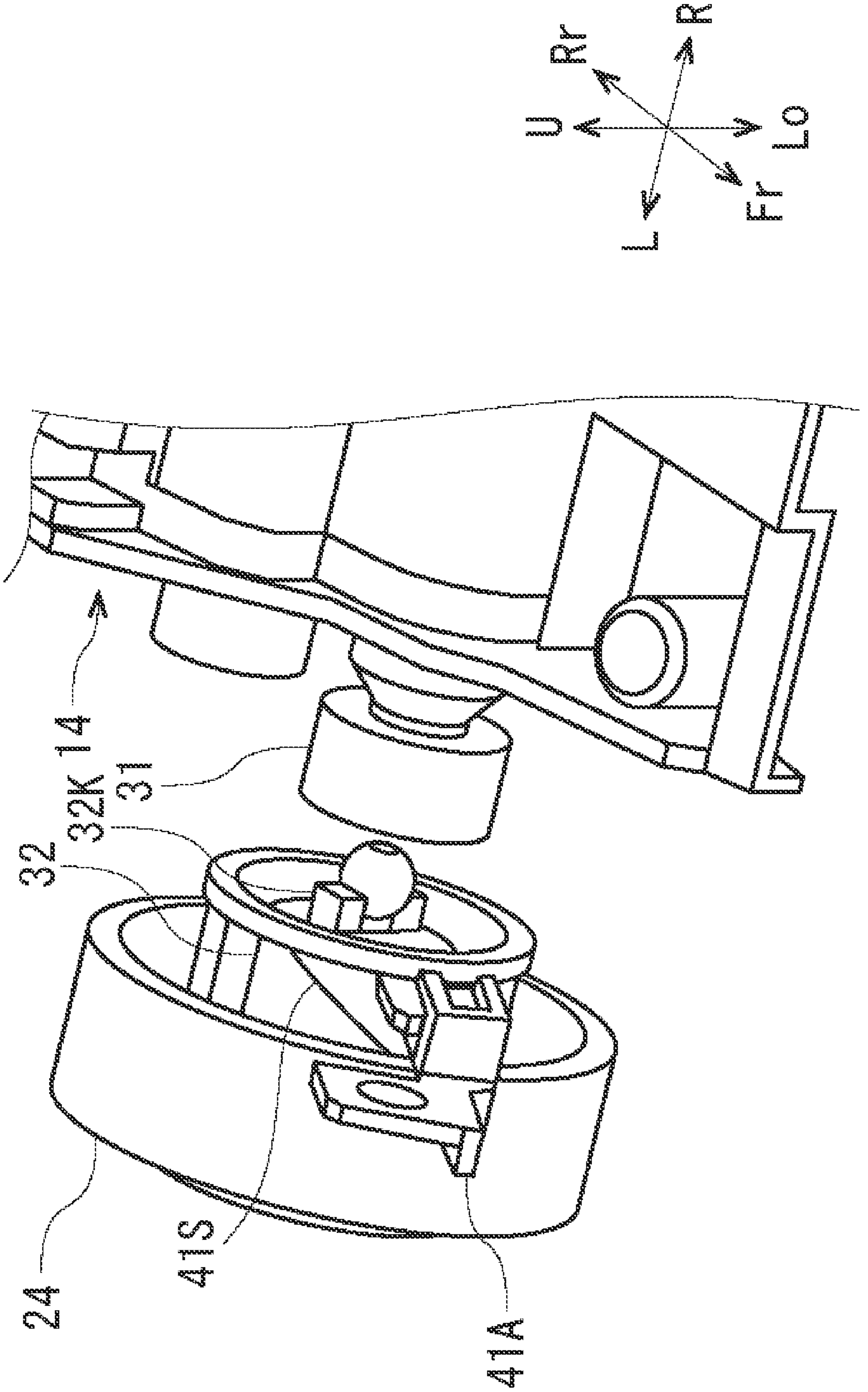
FIG. 16 is a perspective view of the second coupling and its surrounding area when the sheet output tray is opened.

FIG. 15 is a perspective view of the second coupling 32 and its surrounding area when the sheet output tray 9 is closed. FIG. 16 is a perspective view of the second coupling 32 and its surrounding area when the sheet output tray 9 is opened. When the sheet output tray 9 is closed (see FIG. 3), the second coupling 32 is biased to the right by the biasing member 33 and thus connected to the first coupling 31 (see FIGS. 6 and 15). When the user lifts the front end of the sheet output tray 9, the rotary member 41 rotates counterclockwise through the first link member 51 and the second link member 52 as shown in FIGS. 4, 7, and 16. As a result, as shown in FIG. 16, the abutment points of the inclined portions 41S of the rotary member 41 with the projections 42P of the slide member 42 move to the left and, thus, the slide member 42 is pushed out to the left. Along with this, the second coupling 32 is pushed out to the left and thus becomes disconnected from the first coupling 31.

In lifting the sheet output tray 9, the portion of the slit 52S of the second link member 52 near the first end 521 produces no frictional resistance to the pin 53. On the other hand, the portion of the slit 52S near the second end 522 is expanded by the pin 53 and produces frictional resistance to the pin 53. When the sheet output tray 9 is lifted approximately 45° to the horizontal, the pin 53 gets stuck into the boundary portion 52B between the slit 52S and the cutaway 52K. At this time, the portion between the slit 52S and the cutaway 52K elastically deforms to lock the pin 53 therein and, thus, the lifting of the sheet output tray 9 stops.

When the user pushes down the sheet output tray 9, the pin 53 is disengaged from the boundary portion 52B. Thereafter, due to frictional resistance between the slit 52S and the pin 53 produced in the second end 522 side of the slit 52S, the sheet output tray 9 gradually moves down. On the other hand, since no frictional resistance is produced in the first end 521 side of the slit 52S, the sheet output tray 9 is surely closed.

Figure 17:
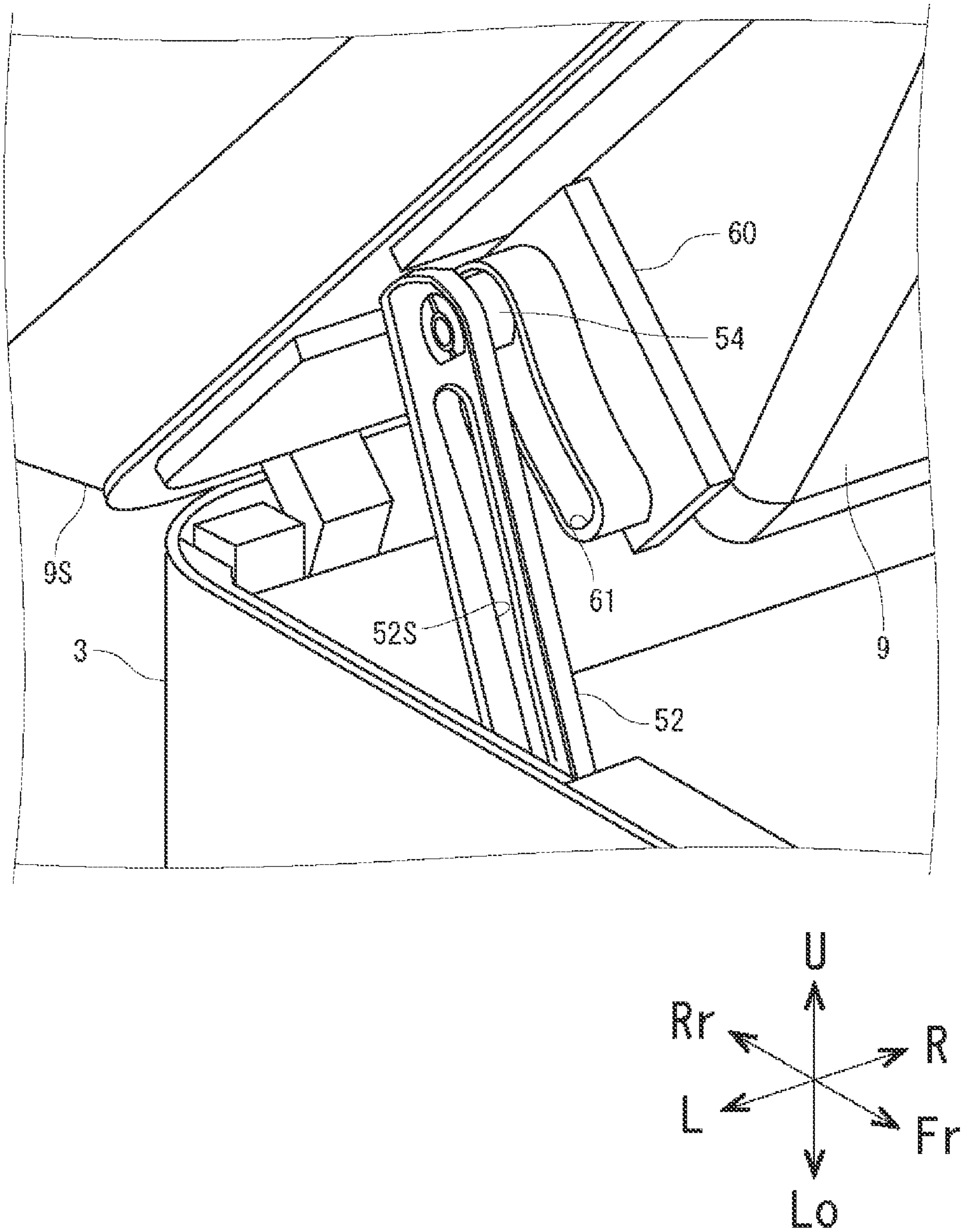
FIG. 17 is a perspective view of a junction portion.
Figure 18:
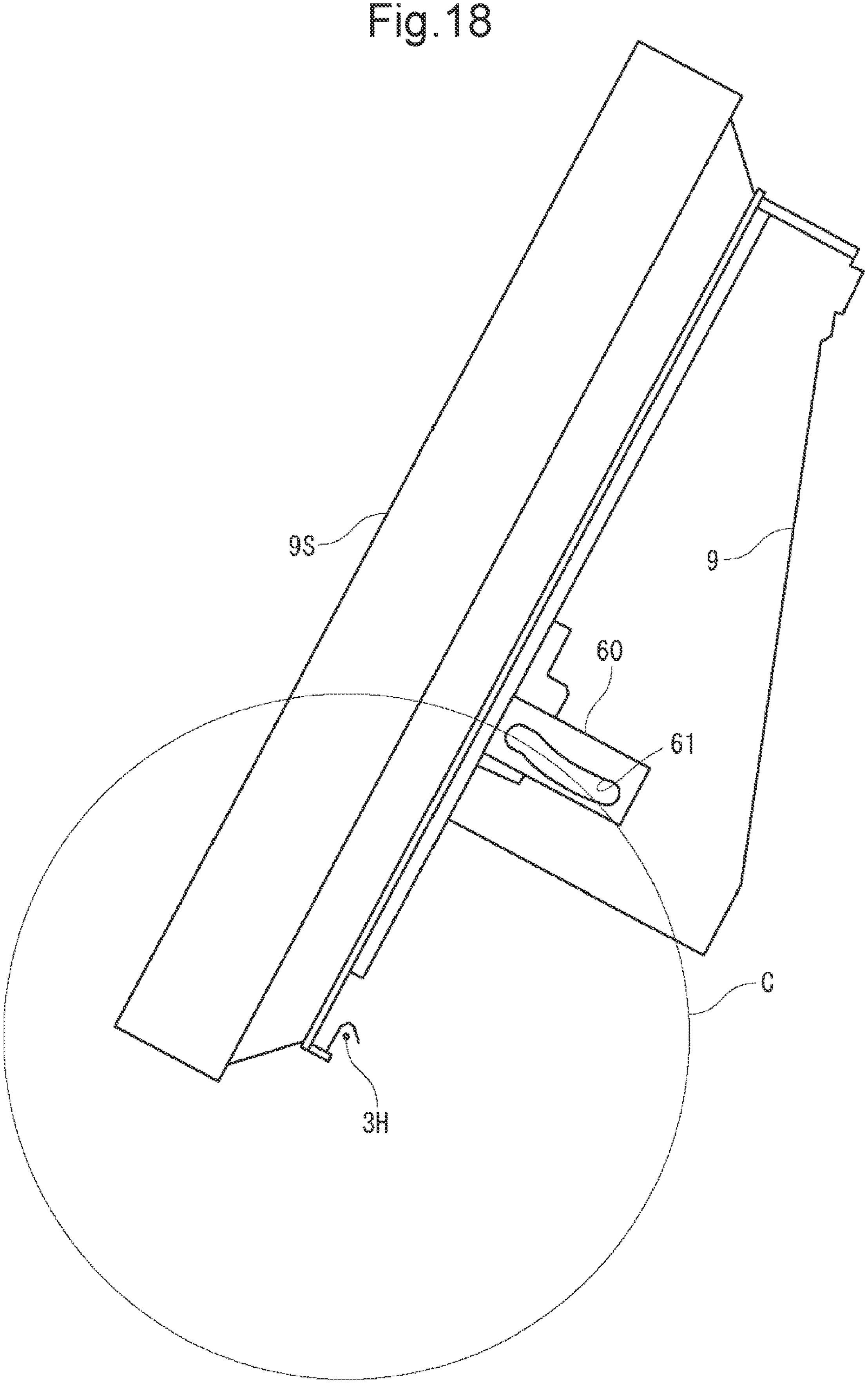
FIG. 18 is a left side view of the junction portion.

Next, a description will be given of a junction portion 60. FIG. 17 is a perspective view of the junction portion 60. FIG. 18 is a left side view of the junction portion 60. The junction portion 60 couples the sheet output tray 9 to the second link member 52. The junction portion 60 is provided slightly rearward of the middle of the left side of the sheet output tray 9 in the front-to-rear direction. The junction portion 60 includes an elongated socket 61 opening to the left and intersecting with the radial direction of the hinge 3H. The elongated socket 61 has a shape curved oppositely to an arc C centered at the axis of the hinge 3H on the sheet output tray 9. A boss 54 projecting to the right is provided at the first end 521 of the second link member 52. The boss 54 is received in the elongated socket 61 of the junction portion 60. The boss 54 is slidable in and along the elongated socket 61.

When the angle of the sheet output tray 9 to the horizontal is within a range of not less than 0° and not more than 45° (see FIGS. 3 and 4), the boss 54 of the second link member 52 is engaged in an upper end of the elongated socket 61 of the junction portion 60. When the sheet output tray 9 is opened more than 45°, the boss 54 slides along the elongated socket 61. When the boss 54 reaches a lower end of the elongated socket 61, the sheet output tray 9 stops at an angle of 65° to the horizontal (see FIG. 5).

Here, a description will be given of the sliding resistance between the boss 54 and the elongated socket 61. The sliding resistance between the boss 54 and the elongated socket 61 is larger than that between the pin 53 and the slit 52S in the second link member 52. Therefore, when the sheet output tray 9 is lifted, the second link member 52 first starts to slide on the pin 53. After the pin 53 gets stuck in the boundary portion 52B, the boss 54 starts to slide in the elongated socket 61.

As described previously, the elongated socket 61 has a shape curved oppositely to the arc C centered at the axis of the hinge 3H on the sheet output tray 9. Therefore, the sliding resistance increases as the boss 54 becomes distant from the upper end of the elongated socket 61, the sliding resistance reaches the maximum when the boss 54 is located substantially midway between the upper end and the lower end of the elongated socket 61, and the sliding resistance decreases as the boss 54 comes close to the lower end from midway in the elongated socket 61. Therefore, when the lifting of the sheet output tray 9 is stopped at an angle of 45°, the sheet output tray 9 can be stopped there.

In order to lift the sheet output tray 9 to an angle of more than 45°, a greater force is required than at 45° or less. When the sheet output tray 9 is lifted to an angle of 65°, the sliding resistance between the boss 54 and the elongated socket 61 can withstand the load of the sheet output tray 9 and, therefore, the sheet output tray 9 can be stopped there.

The general image forming apparatus described previously is designed to stop the cover hinge-connected to the main body when the cover is rotated approximately 90° relative to the horizontal. In this case, there is no problem so long as the cover is lightweight. However, if an image scanner or other heavy objects are provided on the top of the cover, the cover becomes heavy, which increases the force necessary to open the cover. The angle at which the cover is opened may be smaller than 90° in some cases and, in addition, a necessary angle for opening the cover varies depending on the type of work. Therefore, if the cover can be stopped at different angles depending on the type of work, the force necessary to open the cover can be reduced and saved.

To cope with the above problem, the printer 1 according to this embodiment includes the body housing 3, the access opening closure (the sheet output tray 9) mounted through the hinge 3H to the body housing 3, and the link mechanism 23 operatively associated with the opening and closing movement of the access opening closure. The link mechanism 23 includes the rotary member 41, the first link member 51, the second link member 52, the cutaway 52K, the pin 53, the boss 54, and the elongated socket 61.

The rotary member 41 is mounted rotatably to the body housing 3. The first link member 51 is coupled to the rotary member 41. The second link member 52 couples the access opening closure to the first link member 51, is pivotally movable at a first end 521 thereof relative to the access opening closure, and is slidable at a second end 522 thereof with the first link member 51 in the longitudinal direction of the first link member 51. The second link member 52 includes a slit 52S connecting between the first end 521 and the second end 522. The cutaway 52K is formed to communicate with the slit 52S near the second end 522 of the second link member 52 and turn around toward the first end 521 of the second link member 52. The cutaway 52K is narrower than a portion of the slit 52S near the second end 522. The pin 53 is mounted on the body housing 3 and located within the slit 52S. The boss 54 projects in the axial direction of the rotary member 41 from the end of the second link member 52 near the access opening closure. The elongated socket 61 is mounted on the access opening closure and receives the boss 54 slidably therein. The sliding resistance between the boss 54 and the elongated socket 61 is larger than that between the pin 53 and the slit 52S in the second link member 52.

With this structure, the access opening closure can stop in a first open position where the pin 53 gets stuck in the boundary portion 52B between the slit 52S and the cutaway 52K and the boss 54 is engaged in one end of the elongated socket 61 or a second open position where the pin 53 gets stuck in the boundary portion 52B and the boss 54 is engaged in the other end of the elongated socket 61. As a result, the hinge-connected access opening closure can be stopped in two-step open positions.

Furthermore, in the printer 1 according to this embodiment, the elongated socket 61 has a shape curved oppositely to the arc C centered at the axis of the hinge 3H on the sheet output tray 9. As a result, a position where the sliding resistance is high can be easily realized.

In addition, in the printer 1 according to this embodiment, the angle of rotation of the access opening closure is 45° when the pin 53 gets stuck in the boundary portion 52B between the slit 52S and the cutaway 52K and the boss 54 is engaged in one end of the elongated socket 61, whereas it is 65° when the pin 53 gets stuck in the boundary portion 52B between the slit 52S and the cutaway 52K and the boss 54 is engaged in the other end of the elongated socket 61. As a result, the angle of rotation of the access opening closure can be selected according to the type of work.

Furthermore, the printer 1 according to this embodiment includes the developing roller 14R, the first coupling 31, the drive gear 24, the second coupling 32, the biasing member 33, and the slide member 42. The developing roller 14R retains a developer. The first coupling 31 is mounted on the developing roller 14R. The drive gear 24 transmits a drive force to the developing roller 14R. The second coupling 32 is provided coaxially with the drive gear 24 and rotates by following the rotation of the drive gear 24. The second coupling 32 is axially slidable relative to the drive gear 24 and engageable with the first coupling 31. The biasing member 33 biases the second coupling 32 toward the first coupling 31, thus connecting the second coupling 32 to the first coupling 31. The slide member 42 is mounted to the body housing 3 in an axially slidable manner. When the rotary member 41 rotates forward, the slide member 42 pushes out the second coupling 32 against the bias of the biasing member 33. When the rotary member 41 rotates backward, the slide member 42 releases the pushing against the second coupling 32. The rotary member 41 is mounted to the body housing 3 coaxially rotatably with respect to the drive gear 24. The first link member 51 rotates the rotary member 41 forward in conjunction with the opening movement of the access opening closure and rotates the rotary member 41 backward in conjunction with the closing movement of the access opening closure.

With the above structure, the developing roller 14R and the drive gear 24 can be disconnected from each other in conjunction with the opening movement of the access opening closure and can be connected in conjunction with the closing movement of the access opening closure.

The above embodiment can be modified as described below.

Although in the above embodiment the sliding resistance between the elongated socket 61 and the boss 54 is produced by forming the elongated socket 61 in a shape curved oppositely to an arc C centered at the axis of the hinge 3H on the sheet output tray 9, the sliding resistance may be produced in other manners. For example, the sliding resistance may be produced by processing of increasing the surface roughnesses of the elongated socket 61 and the boss 54.

Although in the above embodiment the access opening closure is stopped at angles of rotation of 45° and 65°, the access opening closure may be stopped at other angles of rotation. For example, the access opening closure may be stopped at angles of rotation of 40° and 70°.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:

a body housing;

an access opening closure mounted through a hinge to the body housing; and a link mechanism operable in conjunction with opening and closing movement of the access opening closure, the link mechanism comprising:

a rotary member mounted rotatably to the body housing;

a first link member coupled to the rotary member;

a second link member that couples the access opening closure to the first link member, is pivotally movable at a first end thereof relative to the access opening closure and slidable at a second end thereof with the first link member in a longitudinal direction of the first link member, and is provided with a slit extending in a direction of connection between the first end and the second end;

a cutaway that is formed to communicate with the slit near the second end of the second link member and turn around toward the first end of the second link member and is narrower than a portion of the slit near the second end of the second link member;

a pin mounted on the body housing and located within the slit;

a boss that projects in an axial direction of the rotary member from the first end of the second link member; and an elongated socket that is mounted on the access opening closure and receives the boss slidably therein, wherein a sliding resistance between the boss and the elongated socket is larger than a sliding resistance between the pin and the slit of the second link member.

2. The image forming apparatus according to claim 1, wherein the elongated socket has a shape curved oppositely to an arc centered at an axis of the hinge on the access opening closure.

3. The image forming apparatus according to claim 1, wherein an angle of rotation of the access opening closure, when the pin gets stuck in a boundary portion between the slit and the cutaway and the boss is engaged in one end of the elongated socket, is 45°, and the angle of rotation of the access opening closure, when the pin gets stuck in the boundary portion between the slit and the cutaway and the boss is engaged in the other end of the elongated socket, is 65°.

4. The image forming apparatus according to claim 1, further comprising:

a developing roller that retains a developer;

a first coupling mounted to the developing roller;

a drive gear that transmits a drive force to the developing roller;

a second coupling provided coaxially with the drive gear, rotatable by following rotation of the drive gear, slidable axially relative to the drive gear, and engageable with the first coupling;

a biasing member that biases the second coupling toward the first coupling to connect the second coupling to the first coupling; and a slide member that is mounted to the body housing in an axially slidable manner, pushes out the second coupling against bias of the biasing member when the rotary member rotates forward, and releases pushing against the second coupling when the rotary member rotates backward, wherein the rotary member is mounted to the body housing coaxially rotatably with respect to the drive gear, and the first link member rotates the rotary member forward in conjunction with opening movement of the access opening closure and rotates the rotary member backward in conjunction with closing movement of the access opening closure.

5. The image forming apparatus according to claim 1, wherein the elongated socket and the boss are subjected to processing of increasing surface roughnesses thereof to make the sliding resistance between the boss and the elongated socket larger than the sliding resistance between the pin and the slit.

* * * * *